(12) United States Patent
Mayr et al.

(10) Patent No.: US 12,271,380 B2
(45) Date of Patent: Apr. 8, 2025

(54) INDEX JOIN QUERY OPTIMIZATION

(71) Applicant: SAP SE, Walldorf (DE)

(72) Inventors: Manuel Mayr, Walldorf (DE);
Wolfgang Stephan, Heidelberg (DE);
Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/354,110

(22) Filed: Jul. 18, 2023

(65) Prior Publication Data
US 2025/0028721 A1  Jan. 23, 2025

(51) Int. Cl.
*G06F 16/2453* (2019.01)
*G06F 16/2455* (2019.01)

(52) U.S. Cl.
CPC .... *G06F 16/24544* (2019.01); *G06F 16/2456* (2019.01)

(58) Field of Classification Search
CPC .............. G06F 16/24544; G06F 16/2456
See application file for complete search history.

(56) References Cited

U.S. PATENT DOCUMENTS

| | | | | |
|---|---|---|---|---|
| 2014/0067789 | A1* | 3/2014 | Ahmed | G06F 16/24544 707/E17.017 |
| 2014/0172908 | A1* | 6/2014 | Konik | G06F 16/20 707/769 |
| 2021/0157779 | A1* | 5/2021 | Fender | G06F 16/221 |
| 2024/0004882 | A1* | 1/2024 | Bove | G06F 16/24544 |

OTHER PUBLICATIONS

Deshmukh, H. "To pipeline, or not to pipeline, that is the question." arXiv preprint arXiv:2002.00866 (2020).
"Join Conditions for Tables, Queries, and Views," (Available at https://msdn.microsoft.com/en-us/library/f4saeycb (v=vs.80).aspx), 8 pages.
SAP "SAP HANA Performance Guide for Developers," SAP HANA Platform 2.0 SPS 04; Document Version 1.1—Oct. 31, 2019, (Available at https://help.sap.com/doc/05b8cb60dfd94c82b86828ee77f7e0d9/2.8.04/en-US/SAP_HANA_Performance_Developer Guide_en.pdf), 256 pages.
SAP "SAP HANA SQL and System Views Reference," Sap Hana Platform 2.0, SPS 00; Document Version: 1.0, 30. Nov. 2016, (Available at http://www.taubeta.ru/content/SAP_HANA_SQL.pdf), 1732 pages.

(Continued)

*Primary Examiner* — Courtney Harmon
(74) *Attorney, Agent, or Firm* — Mintz, Levin, Cohn, Ferris, Glovsky and Popeo, P.C.

(57) ABSTRACT

In some implementations, there is provided a method including receiving a query request including a join, wherein the join includes a range between a first predicate of the join and a second predicate of the join; generating a query plan including an index join operator; executing the query plan including the index join operator including getting, from the sorted dictionary, the first value identifier, the second value identifier, and the one or more intervening value identifiers between the first value identifier and the second value identifier and executing the index join operator using the first value identifier, the second value identifier, and the one or more intervening value identifiers to obtain a result set.

20 Claims, 8 Drawing Sheets

(56) References Cited

OTHER PUBLICATIONS

"SQL Join on Table A value within Table B range," (Available at https://web.archive.org/web/20160104231844/https://stackoverflow.com/questions/12604146/sql-join-on-table-a-value-within-table-b-range), 3 pages.
Stonebraker, M et al. "C-Store: A col. Oriented DBMS." Proceedings of 31st VLDB, Trondheim, Normway, Jan. 1, 2005.
Wesley, R et al., "Leveraging compression in the tableau data engine." Proceedings of the 2014 ACM SIGMOD international conference on Management of data. 2014.
Extended European Search Report issued in European Application No. 24184517.1-1203 mailed Nov. 21, 2024, 12 pages.

\* cited by examiner

FIG. 1A

| Sorted Dictionary 117C | |
|---|---|
| Value ID | Attribute |
| 0 | $50.00 |
| 1 | $100.00 |
| 2 | $150.00 |
| 3 | $175.00 |
| 4 | $200.00 |
| 5 | $250.00 |
| 6 | NULL |

| Value ID 117B |
|---|
| 0 |
| 1 |
| 6 |
| 2 |
| 3 |
| 1 |
| 5 |
| 6 |
| 0 |
| 1 |
| 4 |
| 6 |

| Table S 117A |
|---|
| $50.00 |
| $100.00 |
| NULL |
| $150.00 |
| $175.00 |
| $100.00 |
| $250.00 |
| NULL |
| $50.00 |
| $100.00 |
| $200.00 |
| NULL |

INDEX JOIN QUERY OPTIMIZATION

TECHNICAL FIELD

The subject matter described herein relates generally to database processing and more specifically to database query optimization.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for join query optimization. In some implementations, there is provided a system including at least one data processor and at least one memory storing instructions which, when executed by the at least one data processor, cause operations including receiving a query request including a join, wherein the join includes a range between a first predicate of the join and a second predicate of the join; generating a query plan including an index join operator, wherein the index join operator includes a join handler configured to get, from a sorted dictionary at query plan execution, a first value identifier corresponding to the first predicate, a second value identifier corresponding to the second predicate, and one or more intervening value identifiers between the first value identifier and the second value identifier; executing the query plan including the index join operator, wherein the executing further comprises getting, from the sorted dictionary, the first value identifier, the second value identifier, and the one or more intervening value identifiers between the first value identifier and the second value identifier and executing the index join operator using the first value identifier, the second value identifier, and the one or more intervening value identifiers to obtain a result set; and responding to the query request by providing the result set.

In some variations, one or more features disclosed herein including one or more of the following features may be implemented as well. The query request may be received at a database execution engine. The join may select from a first table and a second table one or more values based on the range between the first predicate of the join and the second predicate of the join. The query plan may be generated, by a database execution engine, in response to the query request that is received. The join handler may be configured to include one or more instructions to perform the get from the sorted dictionary. The query plan may include a plurality of operators including the index join operator. The plurality of operators may be configured, by a database execution engine, using at least one pipeline. The executing of the query plan including the index join operator may be performed by at least a database execution engine. The index join operator may include the join handler, and the join handler may get from the sorted dictionary the first value identifier, the second value identifier, and the one or more intervening value identifiers. The index join operator may include the join handler, wherein the join handler may execute the index join operator using the first value identifier, the second value identifier, and the one or more intervening value identifiers.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A database system may use some type of indexing technology to facilitate lookups when performing a join operation. The term "join" refers to a database operation that combines portions of a database, such as combining a portion of a table (e.g., a column) with another portion of another table (e.g., another column). An index may be used to provide an auxiliary data structure that supports efficient data lookup using a key during the join, in which case the join is referred to herein as an "index join." The following is an example of an inner join SQL query:

SELECT *
  FROM T INNER JOIN S
    ON T.a=S.b; Query 1;

wherein this query performs an inner join of table T and table S by combining records from the two tables; wherever the values of "a" at table T match "b" at table S, the matching value is placed in the result set. In other words, the join is performed where predicate values "a" and "b" are equivalent, such as the same, equal, and the like.

Because index implementations can efficiently perform the inner join using an index, query optimization of Query 1 may result in a query optimizer using an index join implementation for the inner join. For example, an index join implementation can only be used if an index on either (or both) column T.a or column S.b has previously been created (or is readily available). In the case of the "index join" with T.a, (as the following BETWEEN query assumes that the index is on column T.a) are used to find the predicate matches for the result set. But the index join optimization which is performed with Query 1 cannot be used when there is a range in the predicate, such as "BETWEEN (S.b, S.c)" in the following query:

SELECT *
  FROM T INNER JOIN S
    ON T.a BETWEEN(S.b, S.c); Query 2;

wherein in Query 2, the index join uses an index for table T and uses a range of predicate values.

Figure 1A:
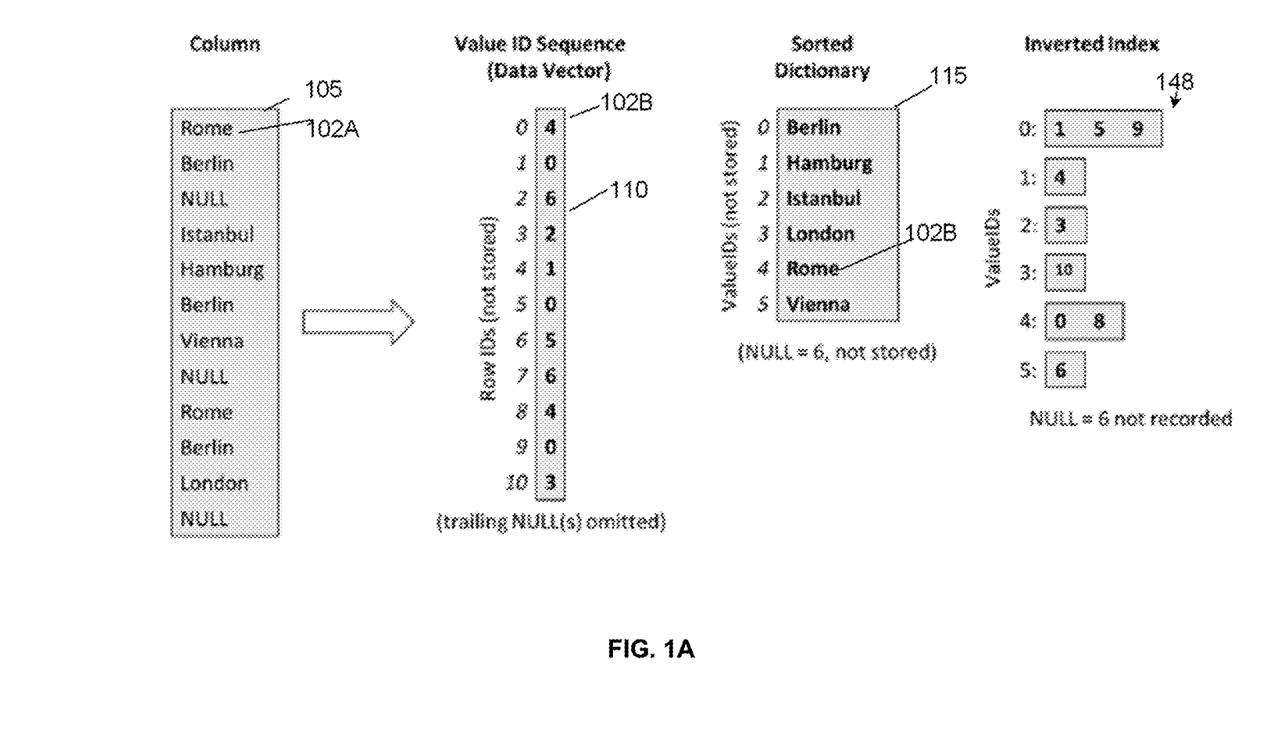
FIGS. 1A and 1B depict examples of dictionary encoding of value identifiers (IDs), in accordance with some implementations.

FIG. 1A depicts an example of the columnar, value-ID-based storage layout employed in a column store database. The data vector 110 represents the attribute values 105 encoded using the dictionary 115 and then stored in the column store database. For example, the attribute value "Rome" 102A is encoded using the dictionary value ID "4" 102B. The other attribute values, such as Berlin, NULL, Istanbul, Hamburg, etc. are also encoded using the dictionary 115. The column 105 can thus be stored in an encoded form (e.g., encoded based on dictionary 115) as the data vector 110 in the column store database (which may be an in-memory column store database as well). In the example of FIG. 1A, NULL values are encoded using the dictionary 115 but may not be stored in the column store database, although they can be stored as well. The inverted index 148 may be used to map each value ID of the data vector 110 to a list of row IDs (which represent row positions) in the data vector 110 that contain the value ID. The example of FIG. 1A illustrates that in the case of indexing, the predicates, such as "b" and "c" correspond to value IDs of the data vector 110 (which are encoded based on dictionary 115), rather than actual range values such as Berlin, Hamburg, etc., so the use value IDs from the index in a range of "b" and "c" can lead to erroneous results with an index join.

In some implementations, there is provided handling of different types of predicates in an index join, such as a range of predicates as noted in the "BETWEEN" at Query 2. Although some of the examples refer to the use of pipelining, the columns of a column store database, and a database execution engine, these are examples as the disclosed systems and methods of handling index joins and ranges may be implemented in other database system environments as well.

In some implementations, the index join predicates are evaluated using a dictionary to obtain value identifiers (IDs). Referring to the example of BETWEEN(S.b, S.c), the first predicate "S.b" is used to determine (e.g., using the dictionary of column T.a, such as the sorted dictionary 115) the first value ID for the first predicate of the index join. Likewise, the second predicate "S.c" is used to determine (e.g., using the dictionary of column T.a) the second value ID for the second predicate of the index join. The range defined by S.b and S.c is converted in a sense to a range of value IDs defined by the dictionary of T.a, such that this value ID range of T.a drives the index lookup on column T.a. In addition, the intervening values IDs of the range are also determined using the dictionary, such as the sorted dictionary 115 for the column T.a. Supposing for example the range between S.b and S.c corresponds to total sales for certain cites and S.b corresponds to a value ID of 1 (Hamburg) at the sorted dictionary 115 and S.c corresponds to a value ID of 4 (Rome) at the sorted dictionary 115. In this example, the database execution engine (and/or a join handler therein) would return the following value IDs for the BETWEEN (S.b, S.c): 1, 2, 3, and 4 (wherein S.b corresponds to 1, S.c corresponds to 4, and the intervening value IDs of the range are 2 and 3). Next, the database execution engine (and/or a join handler therein) would execute a join (e.g., an inner join) on T.a for each of the value IDs 1, 2, 3, and 4. For example, the database execution engine (and/or a join handler therein) executes: FROM T INNER JOIN S ON "T.a=S.b", wherein S.b in this example corresponds to the value ID of 1. This is repeated for each value ID in the range 2, 3, and 4 for example, so the database execution engine (and/or a join handler therein) also executes: FROM T INNER JOIN S ON "T.a=S.b", wherein S.b corresponds to the value ID of 2, and again repeats with S.b with the value ID of 3, and then finally S.b with the value ID of 4. In this way, the range of the BETWEEN is executed using value ID lookups for each value ID of the range that is obtained from the sorted dictionary.

Figure 1B:
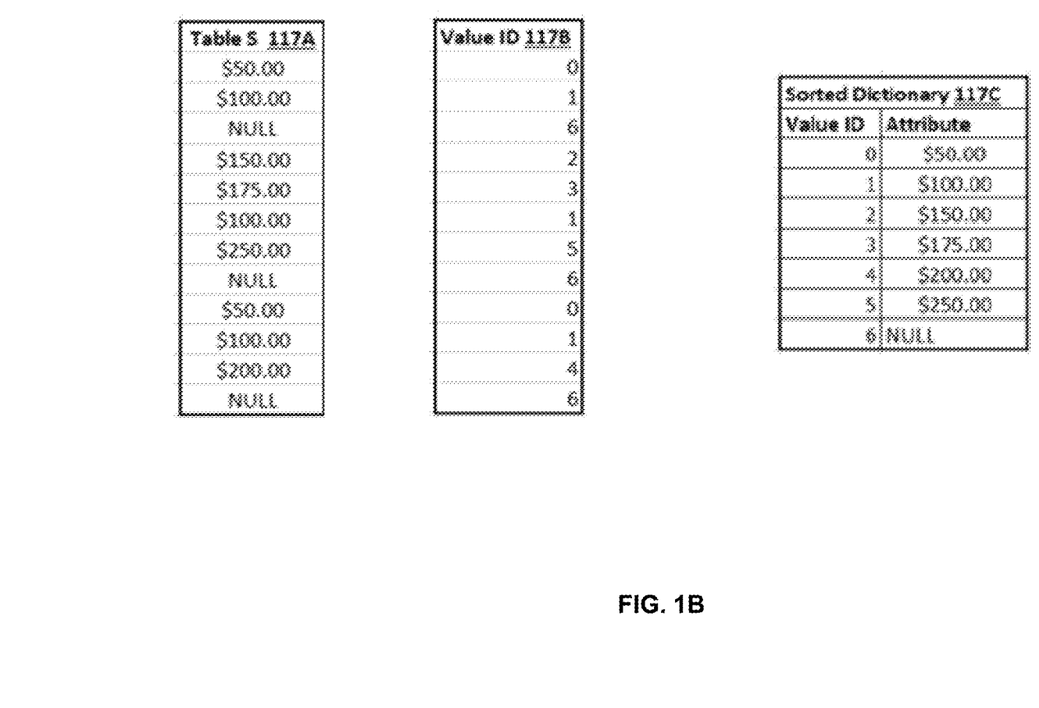

FIG. 1B depicts another example of the attribute values 117A of table S, which are stored in a database as a data vector 117B of value IDs. The value IDs are encoded using a sorted dictionary 117C. In the example of FIG. 1B, the database execution engine may receive a query, such as Query 1, noted above. When this is the case, the database execution engine may generate an executable query plan for execution. During query plan generation, the database execution engine may decide to optimize the query algebra of Query 1 by using an index join. When this is the case, an index join operator is used and this index join operator having a range (e.g., "BETWEEN (S.b, S.c)" is detected. For example, SELECT * FROM T INNER JOIN S ON T.a BETWEEN (S.b, S.c) using an index join is detected. When this inner index join using a range is detected, (or used) the index join operator is configured to include additional logic (e.g., instructions, code, and/or the like) for a join handler. The join handler is configured to at least determine value IDs for the predicates values of the range. For example, the join handler may determine (at query plan execution) the value IDs in the range using the sorted dictionary 117C depicted at FIG. 1B. For example, S.b may have a value of "1" which maps to $100.00" in the sorted dictionary, while S.c may have a predicate value of "4" which maps to "$200.00". In this example, the join handler gets from the sorted dictionary 117C the following value IDs for the range of S.b to S.c: 1, 2, 3, and 4. Next, the join handler includes logic to execute the index join multiple times during query plan execution using the range of value IDs obtained from the sorted dictionary. As such, after the query plan is generated so that includes an index join (which includes the noted "join handler"), the query plan is executed and when the index join operator (which includes the noted "join handler") is executed, the index join operator (which includes the noted "join handler") obtains the range of values IDs as noted above and then executes the index join multiple times for each of the value IDs obtained from the sorted dictionary. By executing the index join multiple times using the value IDs obtained from the sorted dictionary, the query plan can properly execute the index join over the range.

Before providing additional description regarding the handling of index joins and ranges as disclosed herein, the following provides description regarding an example database management system in which the index join query optimization can be practiced.

In some implementations, the database execution engine is comprised or coupled to an in-memory relation database system. In the case of an in-memory relational database system, the in-memory relational database may utilize main memory ("in-memory") for the primary storage of database tables. For example, the in-memory relational database may be implemented as a column-oriented database (or a columnar database) that stores data from database tables by columns instead of by rows. In the case of the in-memory column-oriented relational database for example, each tuple of a relation may correspond to a record occupying one row of a database table while the columns of the database table may store the values of the common attributes shared by multiple tuples, such that the values occupying each column of the database table (which may span multiple rows (or records) of the database table) may be stored sequentially in one or more data pages, with each data page storing at least a portion of a column. The in-memory column-oriented relational database may support efficient data compression and partitioning for massively parallel processing. Because the in-memory database is directly accessible by the central processing unit (CPU) of the computing engine, transactions accessing the in-memory database may be executed to provide near-instantaneous results. Although some of the examples refer to an in-memory database, the subject matter disclosed herein with respect to the custom table scans for top query operators may be used with other types of databases as well.

The throughput and storage capacity of a database, such as an in-memory column-oriented relational database as well as other types of databases, may be maximized by distributing the processing and storage of data across multiple computing nodes. A single database table may therefore be divided into multiple fragments (also referred to as partitions). For example, a fragment can be a portion of a database such as column (or portion thereof), a row (or portion thereof), and/or other portion of a database table. In the case of a plurality of fragments, each fragment may be stored in a computing node (of a plurality of computing nodes) to provide distributed query processing. Doing so may maximize opportunities for parallelization in which a single query is divided into multiple tasks and assigned to individual worker threads for parallel execution. As used herein, the term "worker thread" refers to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In a parallelization framework, a database execution engine (which may also be referred to as a query execution engine or an execution engine, for short) may divide a query accessing a dataset (e.g., one or more database tables) into a quantity of tasks determined based on the quantity of time required to execute the query on a portion of the dataset. As such, if a large quantity of time is required to execute the query on the portion of the dataset, the database execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the database execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads.

Moreover, the database execution engine may also use pipelining. In the case of pipelining, the database execution engine breaks up data into smaller chunks of data, such that each smaller chunk of data can be processed by a series of one or more operators. The operators refer to low-level operators, such as code that performs a specific operation during operator execution, rather than a high-level relational algebra operator. For example, the low-level operator may implement a lock on a database table, perform an index scan, perform a table scan at a given database, and/or the like. During query plan generation and optimization, these low-level operators may be connected with each other to form a graph, such as a directed acyclic graph (DAG). Operators with no outgoing links may split the DAG up into multiple pipelines. For example, a pipeline ends on an operator with no outgoing links and starts with an operator after the previous pipeline ended. Pipeline execution may be performed in a recurrent fashion, such that operator "n" of the pipeline takes a chunk of data as input, performs its operation ("n") on the input data, and then the operator "n" pushes its corresponding output to the next operator "n+1". After the last operator in the pipeline is done performing its operation, control is returned to a prior operator. For example, when operator n+1 is finished, execution control may return to a prior operator n. The operator n may (or may not) continue processing (for example, producing another piece of data and pushing it down the pipeline of operators, performing a cleanup task, freeing resources, and/or the like). In other words, the pipeline represents a set of data processing elements (e.g., operators) connected in series, such that the output of one element of the pipeline is the input of the next element of the pipeline, and buffer storage may be used between the elements. In some instances, the operators of a pipeline can be executed in parallel, sequentially, or in time-sliced fashion.

Figure 1C:
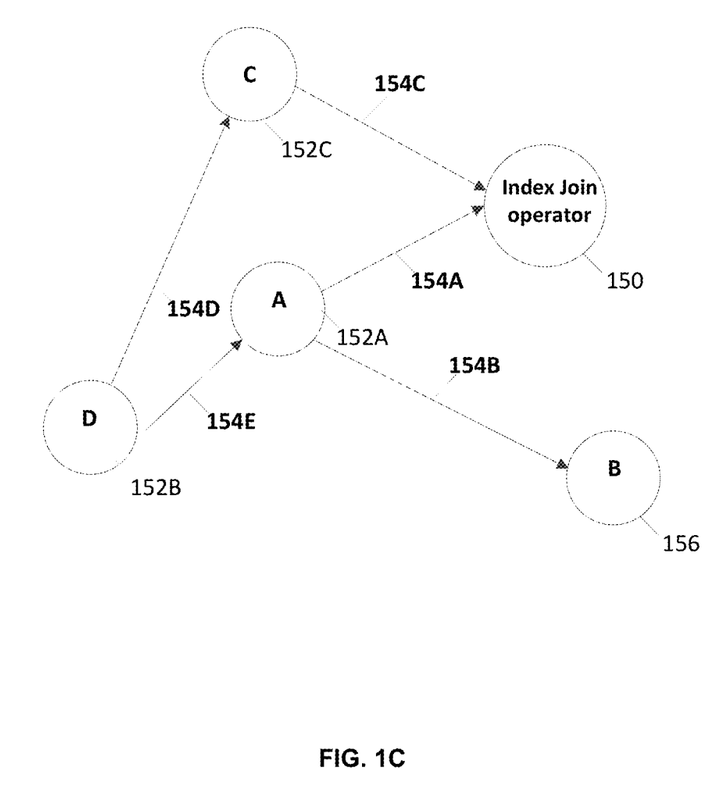
FIG. 1C depicts an example of a query plan of operators configured in a pipeline, in accordance with some implementations.

FIG. 1C illustrates an example of a portion of a directed acyclic graph for a pipeline where the circles correspond to operators 150, 152A-C, and 156, which are connected by links 154A, 154B, 154C, 154D, and 154E. The operators of a pipeline may, as noted, form or represent a directed acyclic graph, and each operator may have one or more outgoing links (which are used to push data) to one or more other operators. Likewise, each operator may have one or more incoming links (which provide data to the operator) from one or more other operators. As noted, FIG. 1C depicts an example of a pipeline including operators 150, 152A-C, and 156, which are connected by links 154A-E.

Figure 2A:
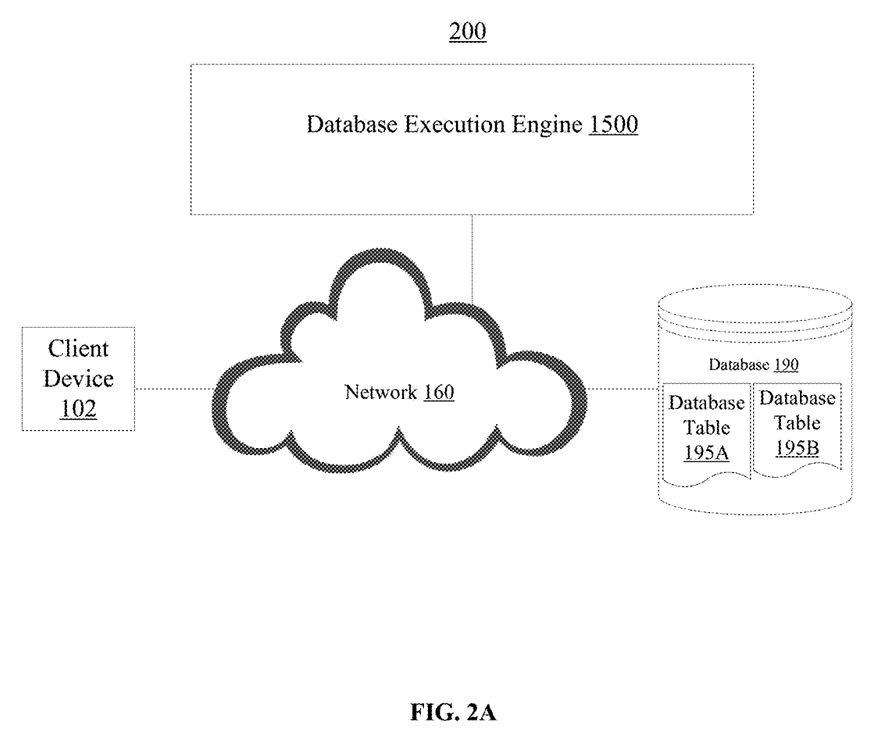
FIGS. 2A and 2B depict examples of systems including a database execution engine, in accordance with some implementations.

FIG. 2A depicts a system diagram illustrating an example of a system 200, in accordance with some example implementations. Referring to FIG. 2A, the system 100 may include one or more client devices such as client device 102, a database execution engine 1500, and one or more databases, such as a database 190. As shown in FIG. 2A, the client device 102, the database execution engine 1500, and the database 190 (which may include one or more database tables 195A-B) may be communicative coupled via a network 160. The one or more databases such as the database 90 may include a variety of relational database technologies including, for example, an in-memory database, a column-based database, a row-based database, hybrid database (e.g., combination of column and row based), and/or the like. The one or more client devices such as client device 102 may include processor-based devices including, for example, a mobile device, a wearable apparatus, a personal computer, a workstation, an Internet-of-Things (IoT) appliance, and/or the like. The network 160 may be a wired network and/or wireless network including, for example, a public land mobile network (PLMN), a local area network (LAN), a virtual local area network (VLAN), a wide area network (WAN), the Internet, and/or the like. Although some of the examples describe the database execution engine 1500 as being separate from the database 190, the database 190 may also include a database execution engine.

Figure 2B:
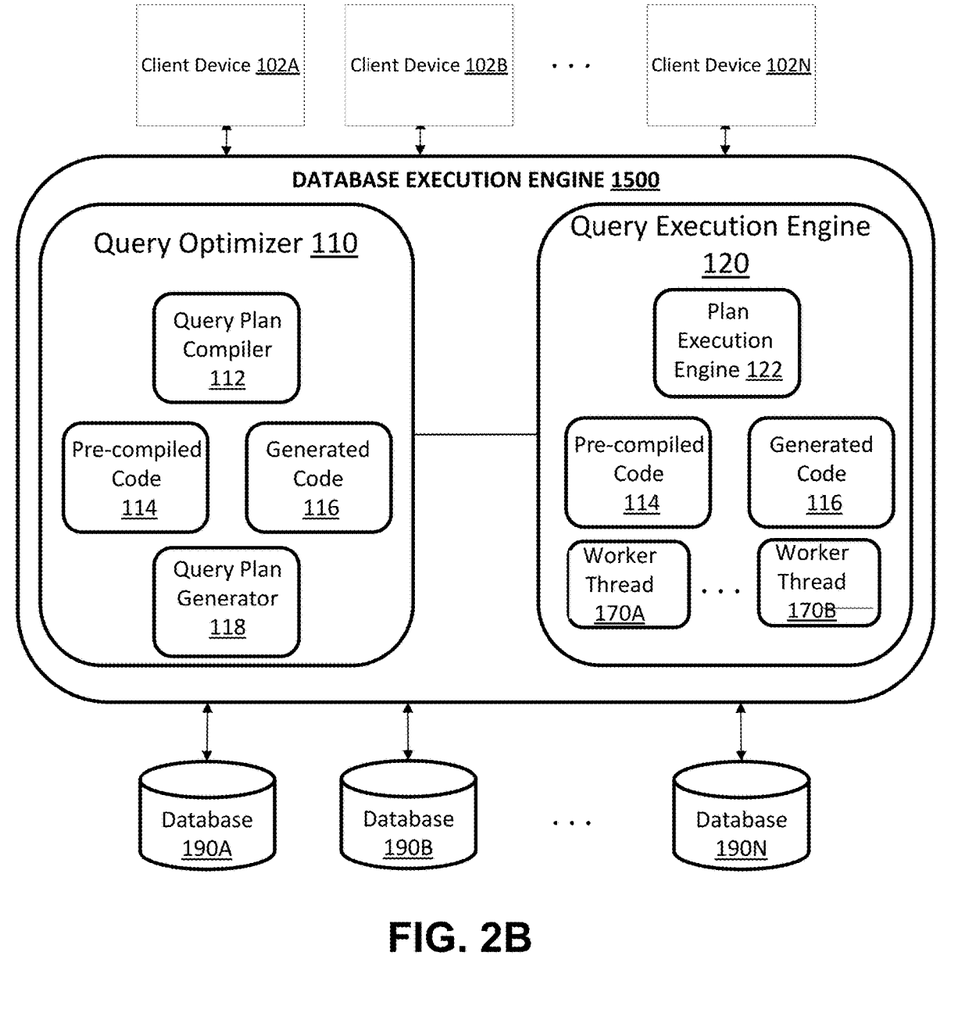

FIG. 2B depicts a block diagram illustrating an example implementation of the database execution engine 1500, in accordance with some example implementations. As shown in FIG. 2B, the one or more databases may include a first database 190A, a second database 190B, and a third database 190C, and the database(s) may represent a database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102A-102N may send a query via the database execution engine 1500 to the database layer including the one or more databases 190, which may represent a persistence and/or storage layer where database tables may be stored and/or queried. The query may be sent via a connection, such as a wired connection and/or wireless connection (e.g., the Internet, cellular links, Wi-Fi links, and/or the like) provided, for example, by the network 160.

The database execution engine 1500 may include a query optimizer 110, such as an SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra" and may be in the form of a directed acyclic graph. The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190. For example, the database execution engine (and/or in particular the query plan optimizer) may choose to optimize the inner join query of Query 1 using an index join as shown at Query 2.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

The query optimizer 110 may optimize the query plan (which may include the noted pipelines of operators) by compiling and generating code. Furthermore, the query optimizer may generate a DAG including operators that may be configured into one or more pipelines. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 1500 and sending some of the operations (or commands in support of an operation, such as a read, write, and/or the like) for execution at one or more of the databases 190A-N.

The query execution engine 120 may, as noted, be configured to handle different types of databases and the corresponding persistent layers and/or tables therein. For example, the one or more databases 190A-N may include at least one row-oriented database, in which case an insert is performed by adding a row with a corresponding row identifier. Alternatively and/or additionally, the one or more databases 190A-N may include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

The database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 1500 may divide the database table 195 into multiple fragments by applying one or more of a hash partitioning, round robin partitioning, and range partitioning.

Figure 3A:
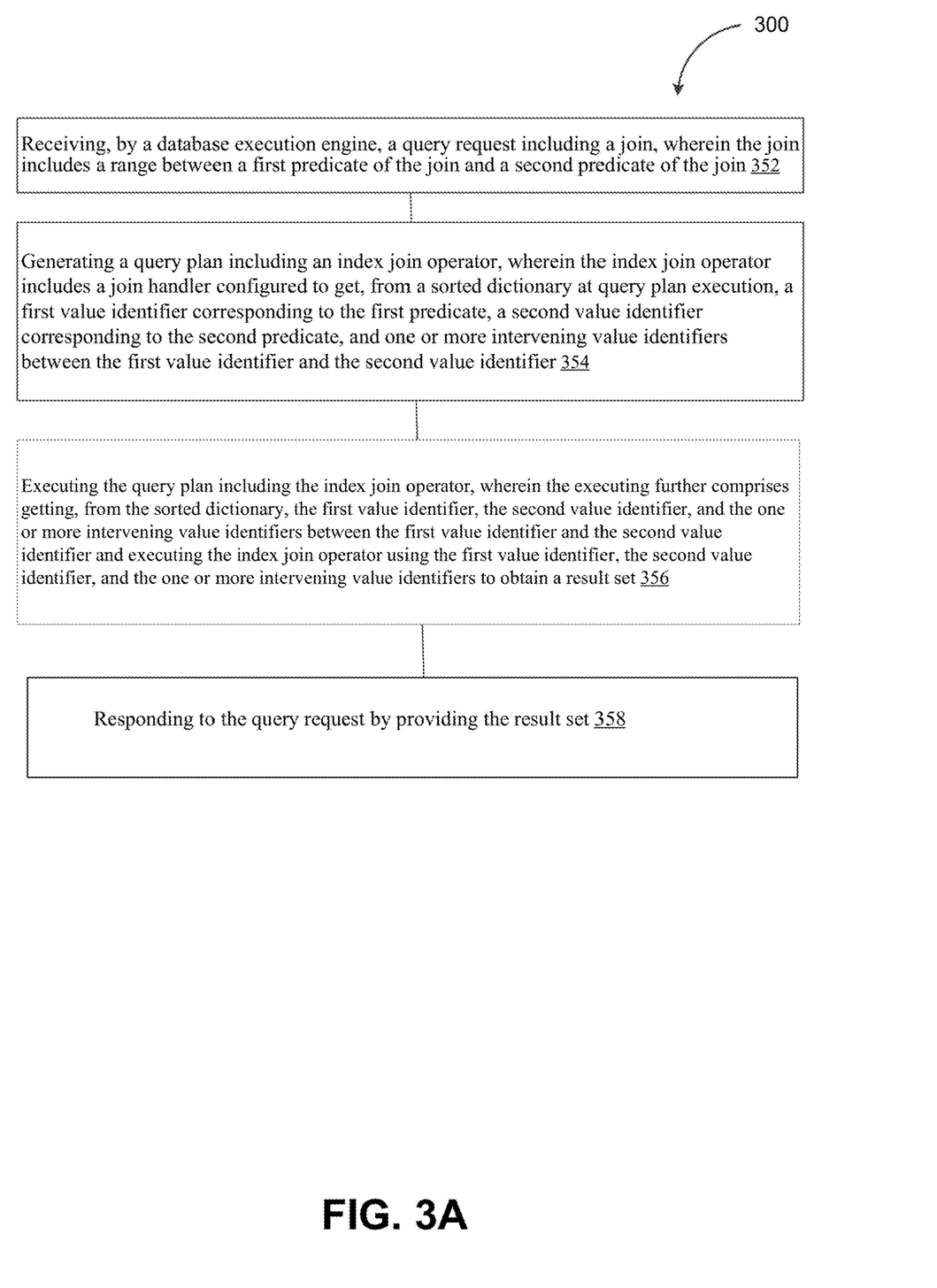
FIG. 3A depicts an example of a process for query optimization and execution using a join index, in accordance with some implementations.

FIG. 3A depicts a flowchart illustrating an example of a process 300 for query optimization of index joins including ranges, in accordance with some example implementations.

At 352, a query request including a join may be received for query plan generation, optimization, and execution, in accordance with some implementations. Moreover, the join may include a range between a first predicate of the join and a second predicate of the join. Moreover, the join may select from a first table and a second table values matching the predicates of the range. For example, the database execution engine 1500 may receive a request for a join, such as Query 2 above, from a client device, such as client device 102A.

At 354, the database execution engine may generate a query plan including an index join operator, wherein the index join operator includes a join handler configured to get, from a sorted dictionary at query plan execution, a first value identifier corresponding to the first predicate, a second value identifier corresponding to the second predicate, and one or more intervening value identifiers between the first value identifier and the second value identifier. For example, in response to receiving the query at 352, the database execution engine (e.g., a query optimizer therein) may generate a query plan. Moreover, the database execution engine 1500 may choose to optimize the query received at 352 with an index join. When this is the case, the index join operator may be configured with a "join handler" to handle the range of value IDs. As noted in the examples above, the join handler is able to (at query plan execution) obtain from the sorted dictionary 115 for table S of Query 2 the values IDs for the predicates, such as the value IDs for the range between S.b and S.c (e.g., a first value identifier corresponding to the first predicate S.b, a second value identifier corresponding to the second predicate S.b, and one or more intervening value identifiers between the first value identifier and the second value identifier such as the value IDs 2 and 3 noted in the example above). Further, the index join operator is also configured to obtain the value ID for the table T (e.g., "T.a"). Alternatively, of additionally, the query plan may include other operators. Alternatively, of additionally, the query plan may include other operators configured to use pipelining as noted above. After the query plan of operators is generated, the query plan of operators may be executed by the database execution engine.

At 356, the database execution engine may execute the query plan including the index join operator, wherein the executing further comprises getting, from the sorted dictionary, the first value identifier, the second value identifier, and the one or more intervening value identifiers between the first value identifier and the second value identifier and executing the index join operator using the first value identifier, the second value identifier, and the one or more intervening value identifiers to obtain a result set. For example, the query plan may include a plurality of operators such as the plurality of operators shown at FIG. 1C. When the index join operator 150 (which includes the join handler logic) is executed as part of the query plan execution, the index join operator 150 gets from the sorted dictionary the first value identifier, the second value identifier, and the one or more intervening value identifiers (which are between the first value identifier and the second value identifier) and the index join executes using the first value identifier, the second value identifier, and the one or more intervening value identifiers for table S (e.g., BETWEEN S.a, S.B) to match with the value ID for table t (e.g., T.a) to obtain the result set.

At 358, the result set is provided as a response to the query request. For example, the database execution engine 1500 may provide the result set of the index join operator as a response to the query request received at 352 (e.g., to a client device).

The database execution engine disclosed in some of the examples herein may be configured to perform one or more of: receive a query, optimize a query, generate a query plan, execute at least a portion of the query plan, and/or perform other database related operations. Moreover, although FIG. 2B depicts a single database execution engine 1500 that is separate from the databases, a given database may include its own database execution engine as well.

Figure 3B:
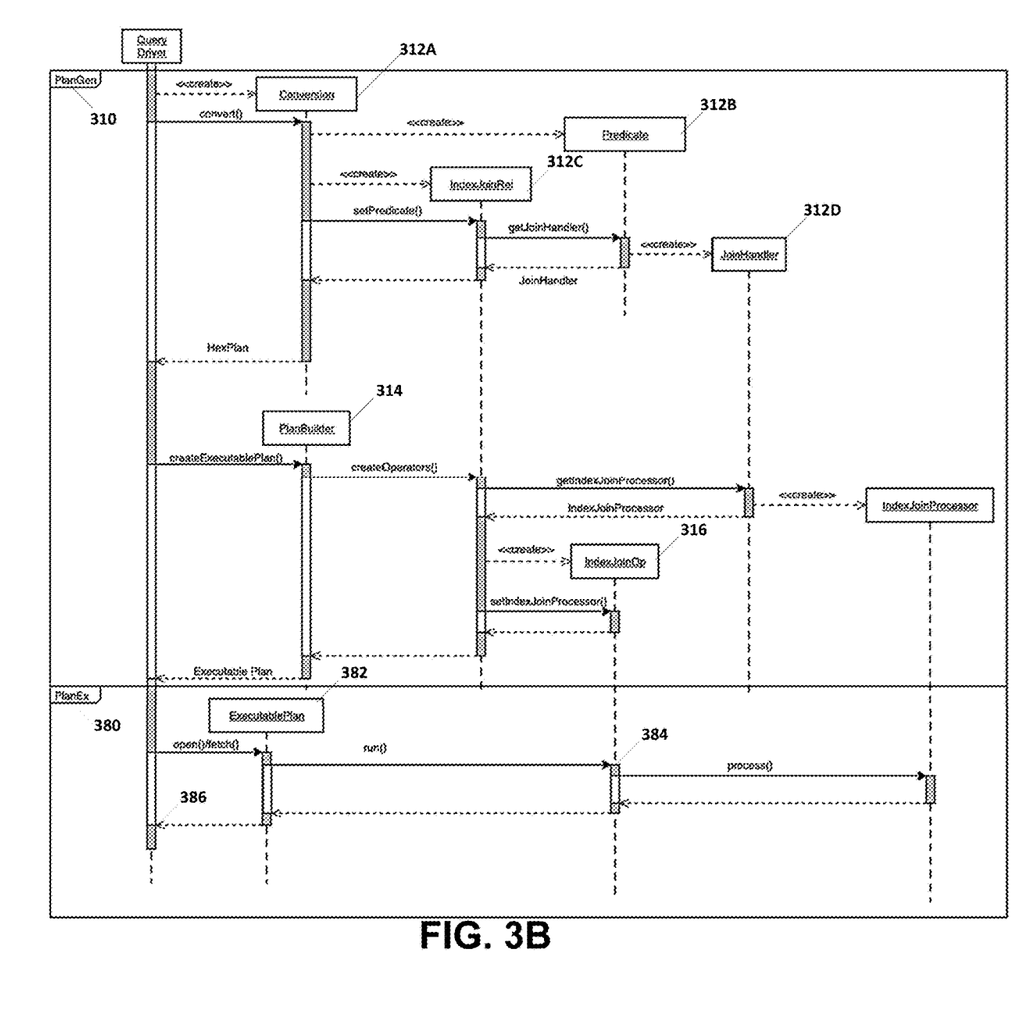
FIG. 3B depicts an example of a process which includes generating a join index operator, in accordance with some implementations.

FIG. 3B depicts an example of a signaling diagram for the index join operator which is configured to include a join handler. During query plan generation 310, a join operator is converted 312A to include predicates 312B, index join relational algebra logic 312C, and a join handler 312D including logic that is configured to (at query plan execution) (1) get the value IDs for the predicates values of the range of the index join and (2) execute the index join multiple times using the obtained value IDs. Next, the query plan is built 314 is built such that it includes a plurality of executable operators including the index join operator 316 (which includes the join handler logic) At query plan execution 380, the query plan is executed at 382 and the index join operator is executed at 384. When executed, the index join operator obtains for example the first value identifier, the second value identifier, and one or more intervening value identifiers (which are between the first value identifier and the second value identifier) are obtained at query plan execution time from the sorted dictionary, and the index join operator executes an index join using each of the obtained value IDs (e.g., for table S) to obtain matches (e.g., table T with a match of index value "a") and form a result set which is provided as a result set at 386.

Figure 4:
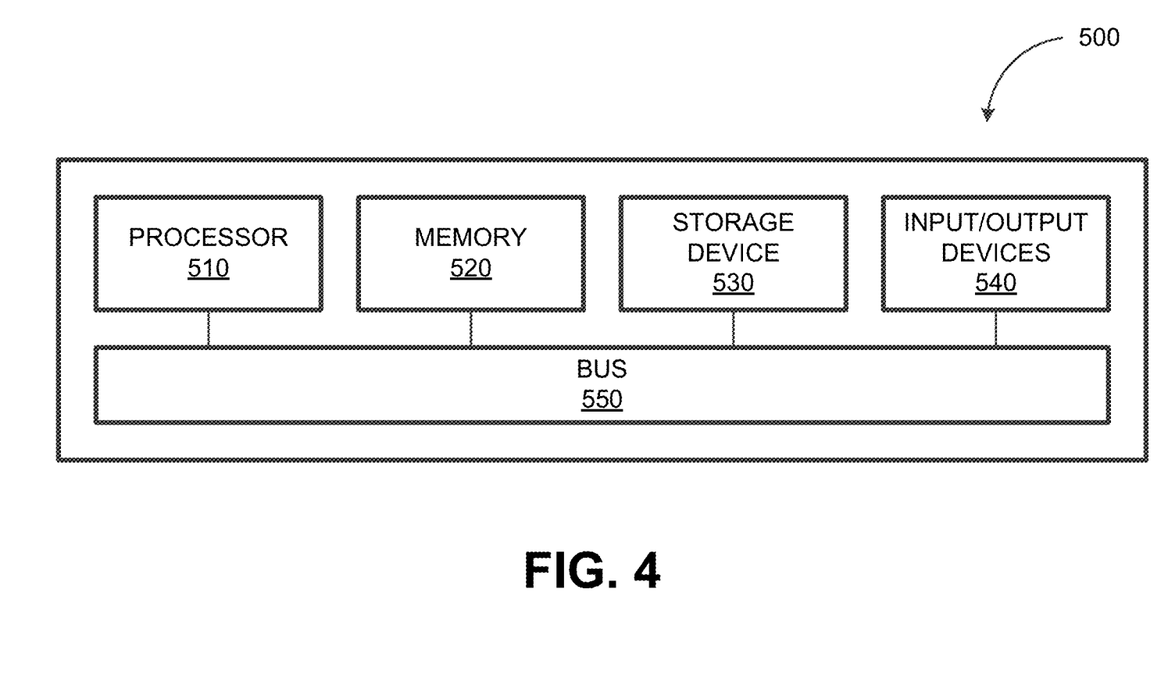
FIG. 4 depicts a block diagram illustrating an example of a computing system, in accordance with some example implementations.

FIG. 4 depicts a block diagram illustrating an example of a computing system 500 consistent with implementations of the current subject matter. Referring to FIGS. 1-4, the computing system 500 may implement the database execution engine 1500 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 1500. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising:
at least one data processor; and
at least one memory storing instructions which, when executed by the at least one data processor, cause operations comprising:
receiving a query request including a join, wherein the join includes a range between a first predicate of the join and a second predicate of the join;
generating a query plan including an index join operator, wherein the index join operator includes a join handler configured to get, from a sorted dictionary at query plan execution, a first value identifier corresponding to the first predicate, a second value identifier corresponding to the second predicate, and one or more intervening value identifiers between the first value identifier and the second value identifier;
executing the query plan including the index join operator, wherein the executing further comprises getting, from the sorted dictionary, the first value identifier, the second value identifier, and the one or more intervening value identifiers between the first value identifier and the second value identifier and executing the index join operator using the first value identifier, the second value identifier, and the one or more intervening value identifiers to obtain a result set; and
responding to the query request by providing the result set.

Example 2: The system of Example 1, wherein the query request is received at a database execution engine.

Example 3: The system of any of Examples 1-2, wherein the join may select from a first table and a second table one or more values based on the range between the first predicate of the join and the second predicate of the join.

Example 4: The system of any of Examples 1-3, wherein the query plan is generated, by a database execution engine, in response to the query request that is received.

Example 5: The system of any of Examples 1-4, wherein the join handler is configured to include one or more instructions to perform the get from the sorted dictionary.

Example 6: The system of any of Examples 1-5, wherein the query plan includes a plurality of operators including the index join operator.

Example 7: The system of any of Examples 1-6, wherein the plurality of operators are configured are executed, by a database execution engine, using at least one pipeline.

Example 8: The system of any of Examples 1-7, wherein the executing of the query plan including the index join operator is performed by at least a database execution engine.

Example 9: The system of any of Examples 1-8, wherein the index join operator includes the join handler, wherein the join handler gets from the sorted dictionary the first value identifier, the second value identifier, and the one or more intervening value identifiers.

Example 10: The system of any of Examples 1-9, wherein the index join operator includes the join handler, wherein the join handler executes the index join operator using the first value identifier, the second value identifier, and the one or more intervening value identifiers.

Example 11: A method comprising: receiving a query request including a join, wherein the join includes a range between a first predicate of the join and a second predicate of the join;
generating a query plan including an index join operator, wherein the index join operator includes a join handler configured to get, from a sorted dictionary at query plan execution, a first value identifier corresponding to the first predicate, a second value identifier corresponding to the second predicate, and one or more intervening value identifiers between the first value identifier and the second value identifier;
executing the query plan including the index join operator, wherein the executing further comprises getting, from the sorted dictionary, the first value identifier, the second value identifier, and the one or more intervening value identifiers between the first value identifier and the second value identifier and executing the index join operator using the first value identifier, the second value identifier, and the one or more intervening value identifiers to obtain a result set; and
responding to the query request by providing the result set.

Example 12: The method of Example 11, wherein the query request is received at a database execution engine.

Example 13: The method of any of Examples 11-12, wherein the join may select from a first table and a second table one or more values based on the range between the first predicate of the join and the second predicate of the join.

Example 14: The method of any of Examples 11-13, wherein the query plan is generated, by a database execution engine, in response to the query request that is received.

Example 15: The method of any of Examples 11-14, wherein the join handler is configured to include one or more instructions to perform the get from the sorted dictionary.

Example 16: The method of any of Examples 11-15, wherein the query plan includes a plurality of operators including the index join operator.

Example 17: The method of any of Examples 11-16, wherein the plurality of operators are configured are executed, by a database execution engine, using at least one pipeline.

Example 18: The method of any of Examples 11-17, wherein the executing of the query plan including the index join operator is performed by at least a database execution engine.

Example 19: The method of any of Examples 11-18, wherein the index join operator includes the join handler, wherein the join handler gets from the sorted dictionary the first value identifier, the second value identifier, and the one or more intervening value identifiers.

Example 20: A non-transitory computer-readable medium including instructions which, when executed by at least one data processor, cause operations comprising:
  receiving a query request including a join, wherein the join includes a range between a first predicate of the join and a second predicate of the join;
  generating a query plan including an index join operator, wherein the index join operator includes a join handler configured to get, from a sorted dictionary at query plan execution, a first value identifier corresponding to the first predicate, a second value identifier corresponding to the second predicate, and one or more intervening value identifiers between the first value identifier and the second value identifier;
  executing the query plan including the index join operator, wherein the executing further comprises getting, from the sorted dictionary, the first value identifier, the second value identifier, and the one or more intervening value identifiers between the first value identifier and the second value identifier and executing the index join operator using the first value identifier, the second value identifier, and the one or more intervening value identifiers to obtain a result set; and
  responding to the query request by providing the result set.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
  at least one data processor; and
  at least one memory storing instructions which, when executed by the at least one data processor, cause operations comprising:
    receiving a query request including a join of a first column with a second column, wherein the join includes a range between a first predicate of the join in the first column and a second predicate of the join in the first column;
    generating a query plan including an index join operator, wherein the index join operator includes a join handler configured to get, from a sorted dictionary at query plan execution, a first value identifier corresponding to the first predicate in the first column, a second value identifier corresponding to the second predicate in the first column, and, for one or more values in the first column between the first predicate and the second predicate, one or more intervening value identifiers between the first value identifier and the second value identifier;
    executing the query plan including the index join operator, wherein the executing further comprises getting, from the sorted dictionary, the first value identifier, the second value identifier, and the one or more intervening value identifiers between the first value identifier and the second value identifier, and executing the index join operator using the first value identifier, the second value identifier, and the one or more intervening value identifiers to obtain a result set; and
    responding to the query request by providing the result set.

2. The system of claim 1, wherein the query request is received at a database execution engine.

3. The system of claim 1, wherein the join may select from a first table and a second table one or more values based on the range between the first predicate of the join and the second predicate of the join.

4. The system of claim 1, wherein the query plan is generated, by a database execution engine, in response to the query request that is received.

5. The system of claim 1, wherein the join handler is configured to include one or more instructions to perform the get from the sorted dictionary.

6. The system of claim 1, wherein the query plan includes a plurality of operators including the index join operator.

7. The system of claim 6, wherein the plurality of operators are configured are executed, by a database execution engine, using at least one pipeline.

8. The system of claim 1, wherein the executing of the query plan including the index join operator is performed by at least a database execution engine.

9. The system of claim 1, wherein the index join operator includes the join handler, wherein the join handler gets from the sorted dictionary the first value identifier, the second value identifier, and the one or more intervening value identifiers.

10. The system of claim 1, wherein the index join operator includes the join handler, wherein the join handler executes the index join operator using the first value identifier, the second value identifier, and the one or more intervening value identifiers.

11. A method comprising:
  receiving a query request including a join of a first column with a second column, wherein the join includes a range between a first predicate of the join in the first column and a second predicate of the join in the first column;
  generating a query plan including an index join operator, wherein the index join operator includes a join handler configured to get, from a sorted dictionary at query plan execution, a first value identifier corresponding to the first predicate in the first column, a second value identifier corresponding to the second predicate in the first column, and, for one or more values in the first column between the first predicate and the second predicate, one or more intervening value identifiers between the first value identifier and the second value identifier;
  executing the query plan including the index join operator, wherein the executing further comprises getting, from the sorted dictionary, the first value identifier, the second value identifier, and the one or more intervening value identifiers between the first value identifier and the second value identifier, and executing the index join operator using the first value identifier, the second value identifier, and the one or more intervening value identifiers to obtain a result set; and responding to the query request by providing the result set.

12. The method of claim 11, wherein the query request is received at a database execution engine.

13. The method of claim 11, wherein the join may select from a first table and a second table one or more values based on the range between the first predicate of the join and the second predicate of the join.

14. The method of claim 11, wherein the query plan is generated, by a database execution engine, in response to the query request that is received.

15. The method of claim 11, wherein the join handler is configured to include one or more instructions to perform the get from the sorted dictionary.

16. The method of claim 11, wherein the query plan includes a plurality of operators including the index join operator.

17. The method of claim 16, wherein the plurality of operators are configured are executed, by a database execution engine, using at least one pipeline.

18. The method of claim 11, wherein the executing of the query plan including the index join operator is performed by at least a database execution engine.

19. The method of claim 11, wherein the index join operator includes the join handler, wherein the join handler gets from the sorted dictionary the first value identifier, the second value identifier, and the one or more intervening value identifiers.

20. A non-transitory computer-readable medium including instructions which, when executed by at least one data processor, cause operations comprising:

receiving a query request including a join of a first column with a second column, wherein the join includes a range between a first predicate of the join in the first column and a second predicate of the join in the first column;

generating a query plan including an index join operator, wherein the index join operator includes a join handler configured to get, from a sorted dictionary at query plan execution, a first value identifier corresponding to the first predicate in the first column, a second value identifier corresponding to the second predicate in the first column, and, for one or more values in the first column between the first predicate and the second predicate, one or more intervening value identifiers between the first value identifier and the second value identifier;

executing the query plan including the index join operator, wherein the executing further comprises getting, from the sorted dictionary, the first value identifier, the second value identifier, and the one or more intervening value identifiers between the first value identifier and the second value identifier, and executing the index join operator using the first value identifier, the second value identifier, and the one or more intervening value identifiers to obtain a result set; and responding to the query request by providing the result set.

* * * * *